Figure 5:
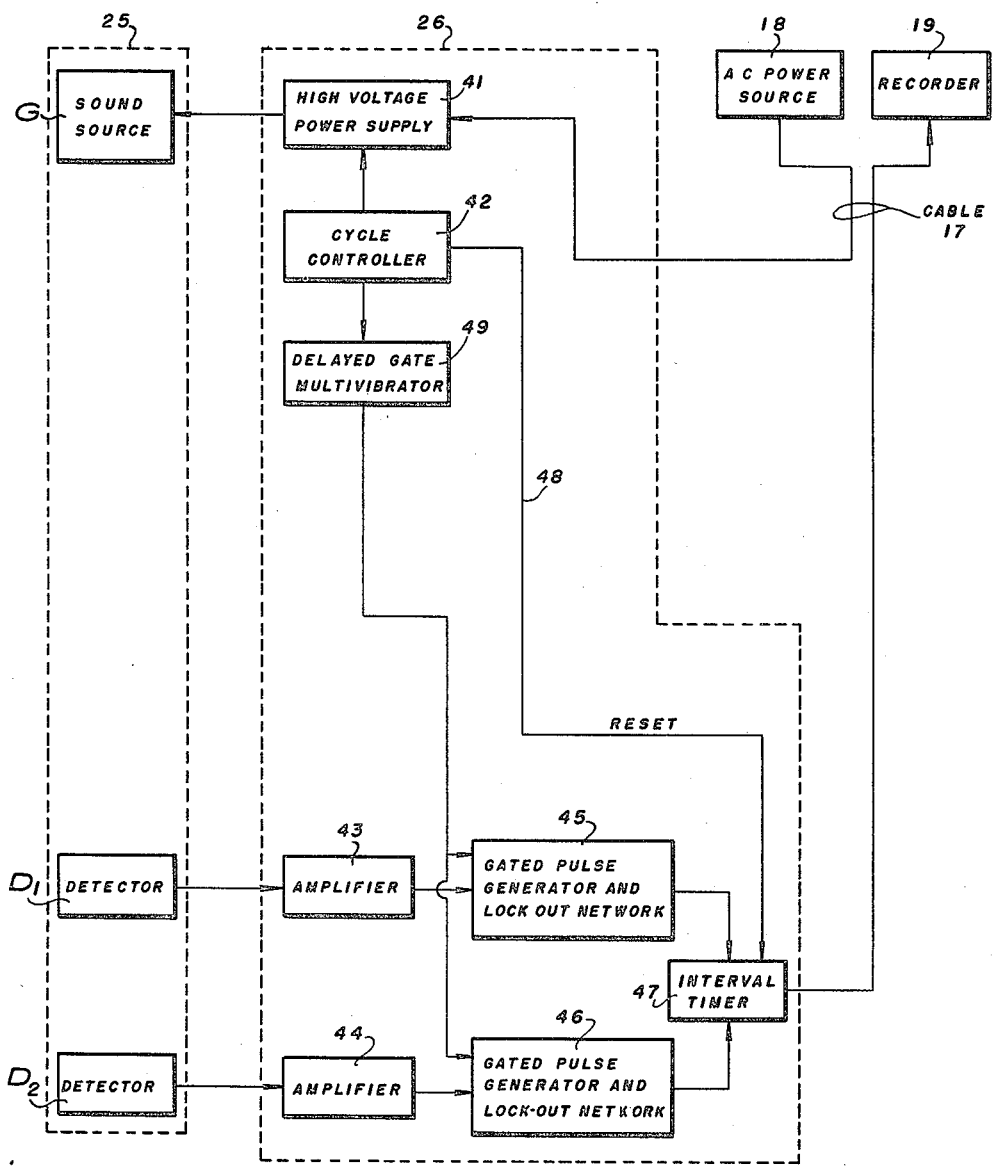

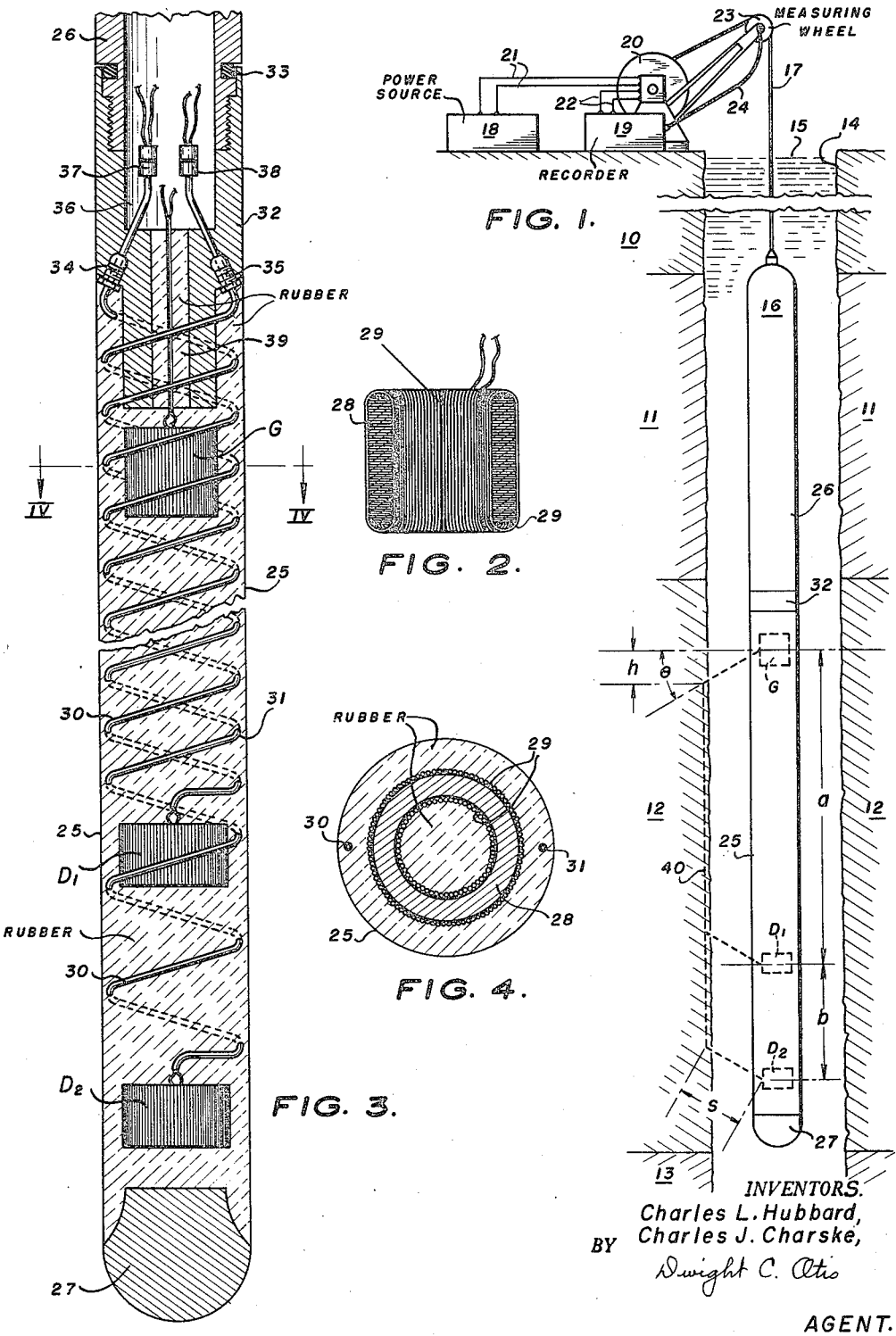
May 31, 1960 — C. J. CHARSKE ET AL — 2,938,592
SEISMIC VELOCITY WELL LOGGING APPARATUS
Filed March 23, 1953 — 6 Sheets-Sheet 1
INVENTORS.
Charles L. Hubbard,
Charles J. Charske,
BY Dwight C. Otis
AGENT.

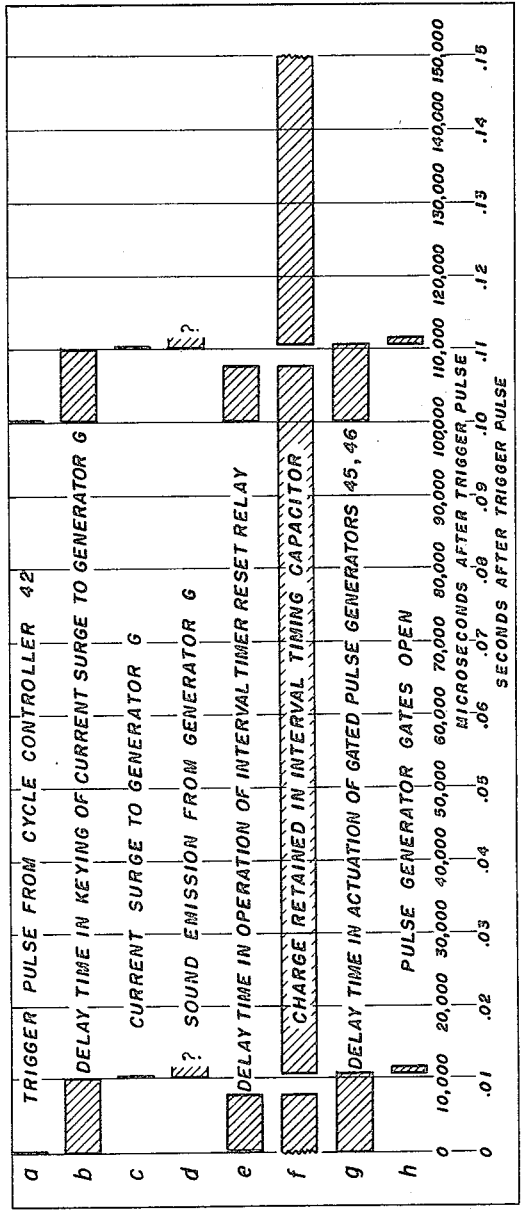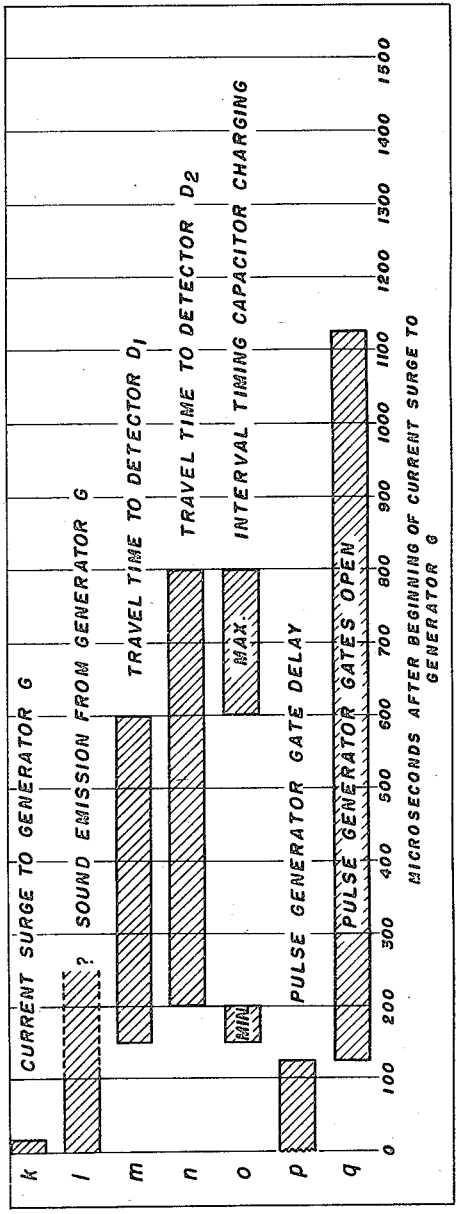
FIG. 6A.
FIG. 6B.

May 31, 1960 C. J. CHARSKE ET AL 2,938,592
SEISMIC VELOCITY WELL LOGGING APPARATUS
Filed March 23, 1953 6 Sheets-Sheet 4

INVENTORS.
Charles L. Hubbard,
Charles J. Charske,
BY Dwight C. Otis
AGENT.

May 31, 1960  C. J. CHARSKE ET AL  2,938,592
SEISMIC VELOCITY WELL LOGGING APPARATUS
Filed March 23, 1953  6 Sheets-Sheet 5

INVENTORS.
Charles L. Hubbard,
Charles J. Charske,
BY Dwight C. Otis
AGENT.

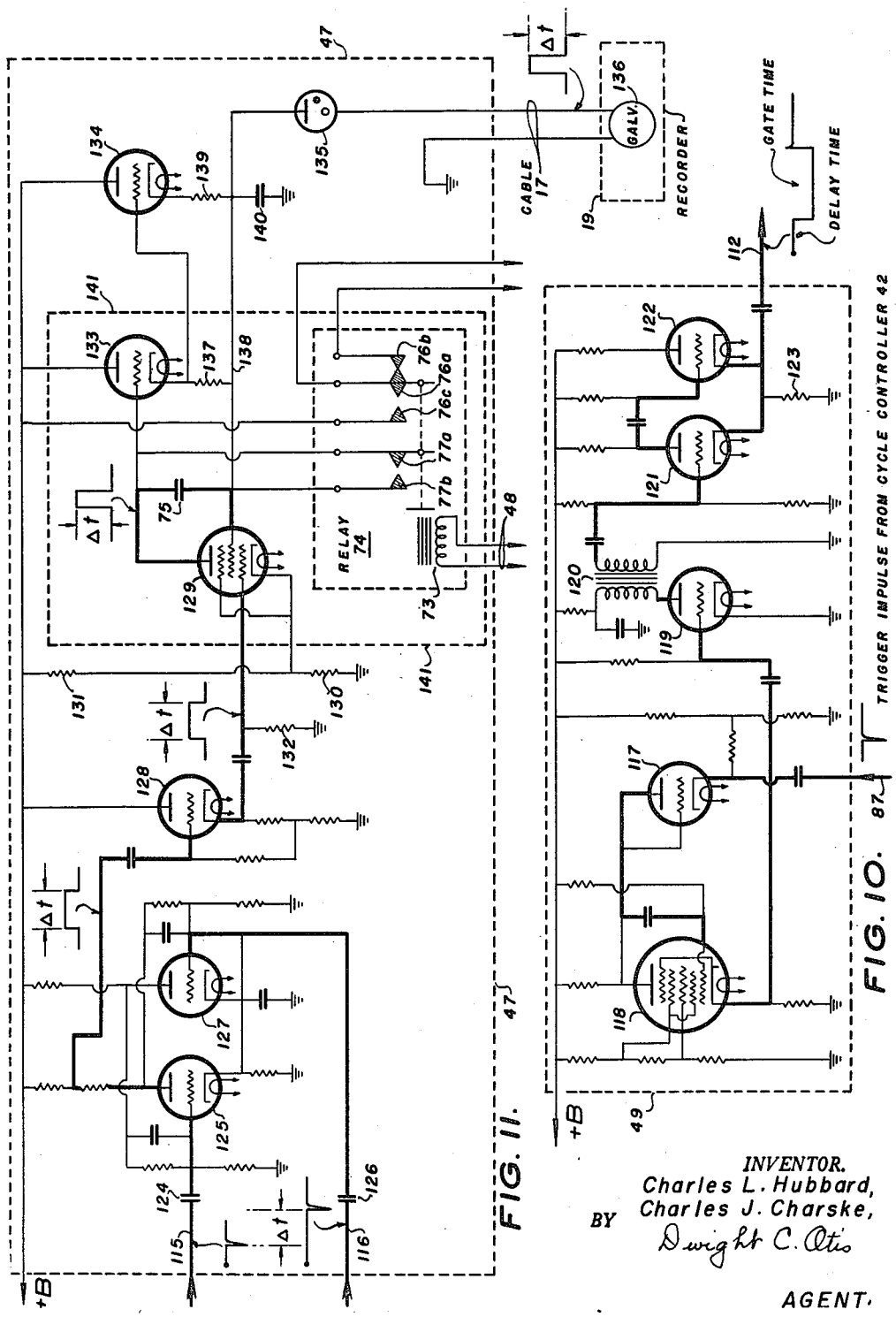

United States Patent Office 2,938,592
Patented May 31, 1960

2,938,592
SEISMIC VELOCITY WELL LOGGING APPARATUS

Charles J. Charske and Charles L. Hubbard, Houston, Tex., assignors, by mesne assignments, to Jersey Production Research Company, Tulsa, Okla., a corporation of Delaware Filed Mar. 23, 1953, Ser. No. 344,134

9 Claims. (Cl. 181—.5)

This invention relates to the logging of earth strata traversed by a well bore. More particularly, the invention relates to apparatus adapted to be moved continuously through a well bore in the earth and to record continuously as a function of depth in the borehole, a quantity which is directly proportional to the local velocity of propagation of sonic or seismic impulses in lithologic strata traversed by the well bore.

Prior to the present invention various methods for measuring local velocity of propagation of seismic waves in subterranean strata have been disclosed and certain forms of apparatus have been suggested for the practice of these methods. Basically, all of these methods contemplate the production of one or more sonic impulses at a source within a well bore and the measurement of the time required for these impulses to reach a receiver spaced at a distance from the source.

However, despite the recognized utility which such measurements might have in exploration of subterranean strata, and despite a strong commercial demand for such measurements, the methods of the prior art have not been widely adopted in commercial practice because of many heretofore unsolved problems in the construction of field-worthy apparatus for practicing these methods. One such problem has been the construction of practical means for suitably supporting the required sonic impulse generator in spaced relation to the required sonic impulse receiver while simultaneously isolating these elements so that impulses propagated through the supporting means would not interfere with or be confused with the desired impulses propagated through earth formations adjacent thereto.

Another problem has been the introduction into the earth formations of sonic impulses of sufficient intensity to be detected accurately without, at the same time, producing in the supporting structure and, by reverberation in the fluid-filled borehole, extraneous noises of sufficient intensity to interfere seriously with the reception of the relatively weak impulses propagated in the earth strata adjacent the well bore.

The logging of strata along the walls of deep wells must obviously be conducted by remote control from the surface of the earth. This is most readily accomplished with the aid of precision electrical apparatus. A major portion of the elements of such electrical apparatus may be enclosed in a probe body which is moved through the well bore, or a large portion of these elements may be arranged at the surface of the earth and be connected through a multi-conductor cable to the remaining elements enclosed within the probe body. In either case, however, operation of the required precision apparatus introduces still another problem into seismic velocity logging operations, namely the prevention of electrical feed-over from relatively high level sonic generation equipment to much lower level sonic detection equipment. While electrical feed-over in precision laboratory instruments can ordinarily be controlled by suitable spacing and orientation of certain parts, by shielding other parts, and by using as short electrical leads as possible, the space limitations within the usual small diameter, elongated probe body capable of being moved through conventional well bores precludes the suitable spacing or electrical shielding of parts contained therein. This fact complicates the problem of electrical feed-over when a major portion of the electrical parts are enclosed within the probe. In the case where a large portion of the elements of the apparatus is arranged at the surface of the ground and is connected through a multi-conductor cable to another portion contained within the probe in the well, it has been observed that electrical feed-over occurs between the long conductors of the cable and no practical amount of shielding of these conductors will fully eliminate the feed-over.

We have now devised a rugged, unitary apparatus which solves many of the aforementioned practical problems not heretofore solved by workers in the prior art, and we have constructed an apparatus which produces reliable, continuous seismic velocity logs in deep well bores.

One novel feature of the improved apparatus of our invention includes two electro-acoustic transducers, employed as sonic detector devices, fixedly spaced at different distances in a common direction from another electro-acoustic transducer, employed as a sonic impulse generator device.

A second novel feature of the improved apparatus of our invention includes the solid embedment of the aforementioned sonic detector and generator devices, in the aforementioned spaced relationship, within a body of pliable, vulcanized rubber.

Another novel feature of the apparatus of our invention includes the combination, with the aforementioned features, of means for supplying a plurality of sharp, relatively widely spaced pulses of energy to the sonic generator device, and means for measuring and recording the time difference between first arrivals of each sonic impulse at the two differently-spaced detector devices.

Still another novel feature of the apparatus of our invention includes, in combination with the above features, timing means for regulating the periodicity of production of a plurality of spaced sonic impulses, means for gating the responsiveness of the detector devices to insure operation of the latter only within a fixed portion of the time between generation of successive sonic impulses, and lock-out means for rendering each of the detector devices successively inoperative immediately after the first arrival of sonic energy at the respective detectors within the gated time interval.

Figure 7:
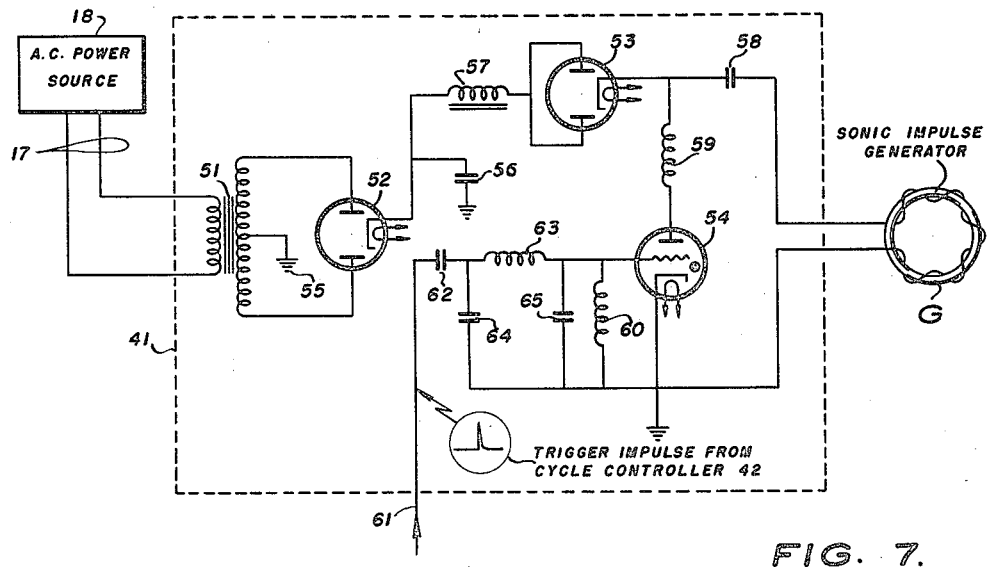
Figure 8:
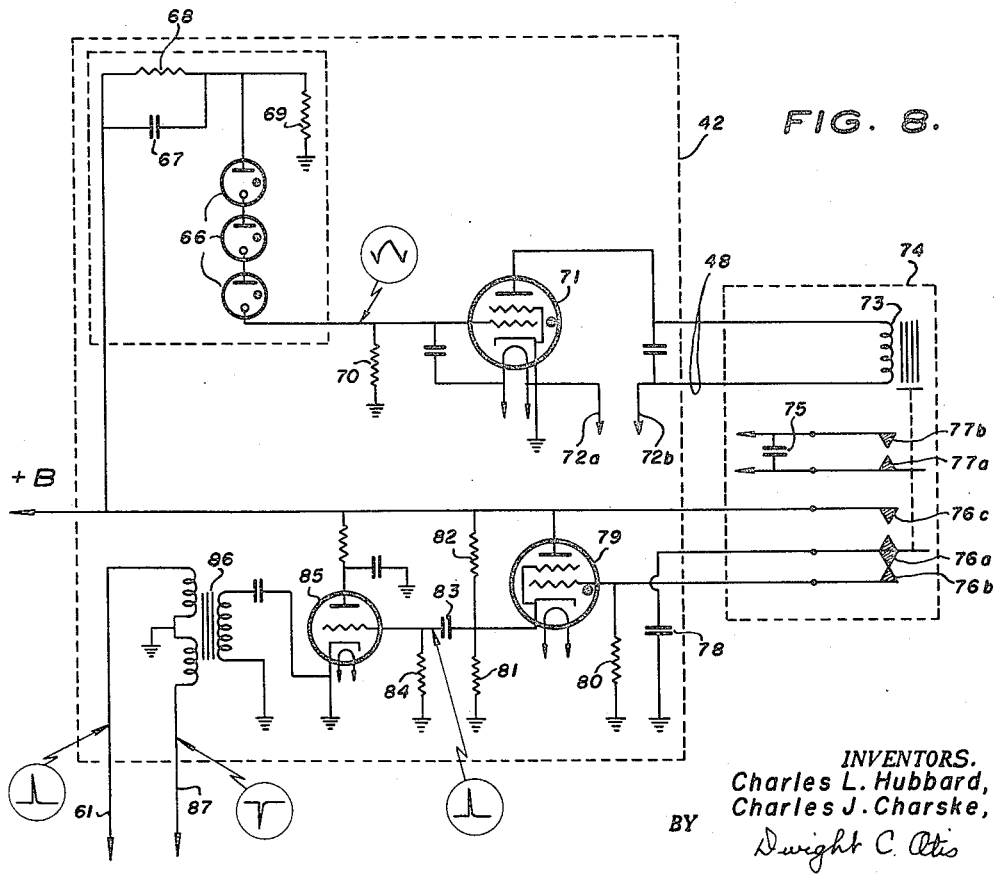
Figure 9:
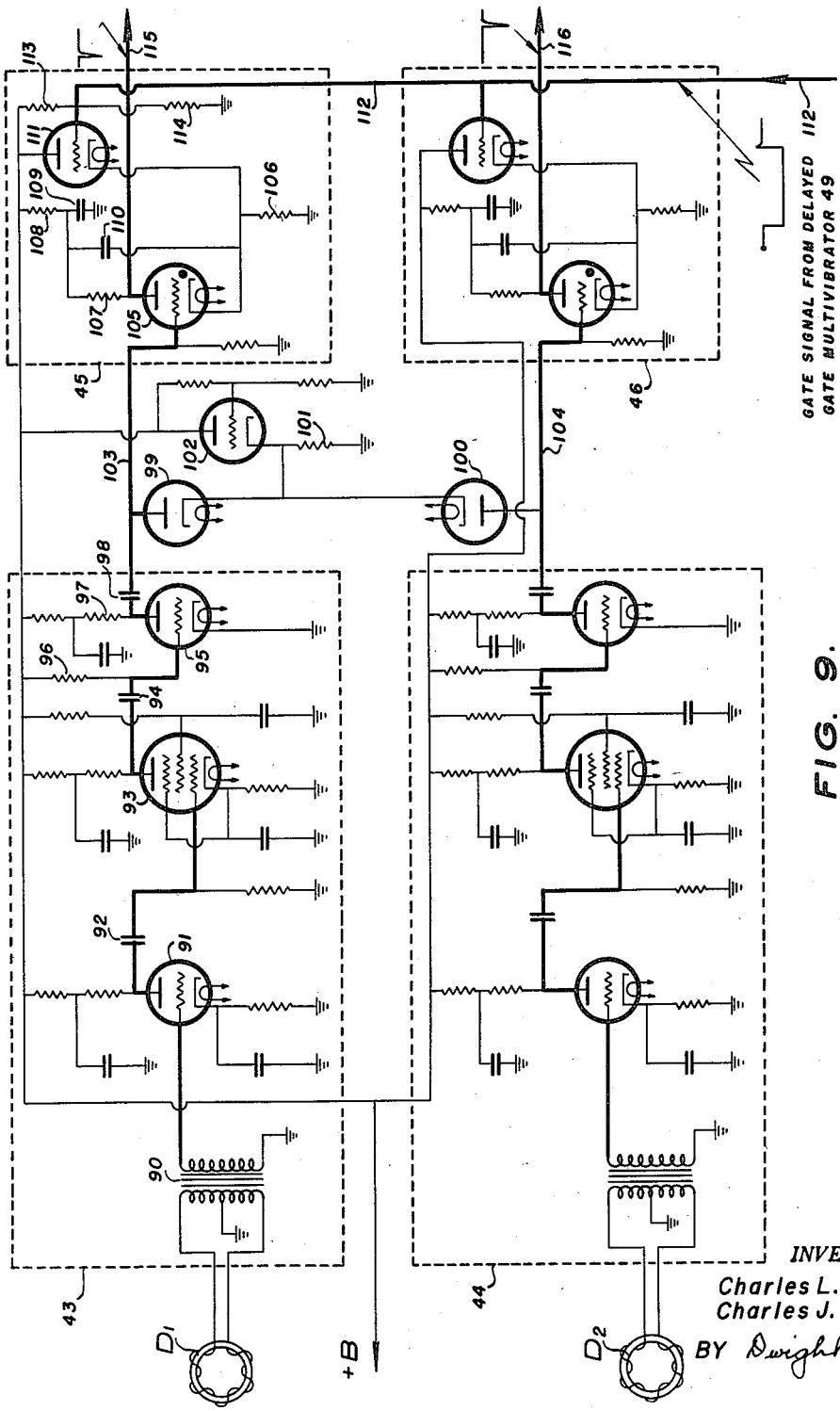

Still other novel features of the apparatus of our invention will become apparent, or will be pointed out, in connection with the detailed description of the accompanying drawings, in which:

Figure 1 is an elevation view, partly in section, showing schematically one form of the improved apparatus of our invention suspended in a well bore, together with certain auxiliary apparatus arranged outside the well bore, Figure 2 is a sectional elevation view of one of the transducers employed in the apparatus of Figure 1, Figure 3 is an elevation view, partly in section, showing certain details of a portion of the apparatus shown in Figure 1, Figure 4 is a horizontal sectional view of the apparatus of Figure 3, taken along the section line IV—IV, Figure 5 is a block diagram illustrating in a general way the electrical interconnection of various elements of the apparatus, Figures 6A and 6B are charts indicating timing of various operations, or events, which occur within the apparatus, Figure 7 is a schematic circuit diagram of a suitable power supply or power conversion unit for supplying spaced surges of current to the sonic impulse generator device, Figure 8 is a schematic circuit diagram of a preferred form of cycle control means adapted to initiate operation of several elements of the apparatus at proper instants within each of a plurality of successive cycles of operation, Figure 9 is a schematic circuit diagram of suitable electronic amplifiers and gated pulse generators which are associated with the sonic impulse detector devices in a preferred form of our apparatus, Figure 10 is a schematic circuit diagram of an electronic gate control means adapted to render the pulse generators of Figure 9 operative during a specific portion of each operating cycle, and Figure 11 is a schematic circuit diagram of an electronic interval timing unit adapted to produce, in cooperation with elements of the apparatus represented in the preceding diagrams, a quantity which is proportional to the time difference between the first arrivals of each sonic pulse at the detectors shown in Figures 1 and 3.

Referring first to Figure 1 of the drawing there is illustrated a sectional view of a portion of the earth's crust made up of a plurality of different lithologic strata, or formations, such as 10, 11, 12, and 13, which are traversed by a well or borehole 14. Usually the well 14 is filled with water, mud, or other drilling fluid whose upper surface is indicated at 15. Within well 14 there is shown an elongated probe or body, designated generally by the numeral 16, which may be moved freely through the well upon a cable 17.

As will be understood by workers in the art, the cable 17 may include one or more flexible steel strands of adequate strength to carry safely the weight of the probe 16. Also cable 17 will include a plurality of insulated conductors adapted to conduct electrical power from a source 18 to certain elements carried by probe 16, and also adapted to conduct from other elements within probe 16 an electrical signal which may be continuously recorded by a recording means 19 as the probe is moved along the well bore. The cable 17 may conveniently be carried upon a reel 20, provided with slip rings and brushes or equivalent means permitting electrical connection of the insulated conductors in the cable to the power source 18 and to recording means 19 through pairs of conductors 21 and 22, respectively.

So that the record produced by recording means 19 may be continuously correlated with the depth of the probe 16 in the well, a measuring wheel 23 may be provided adjacent the mouth of the well and suitable mechanism associated with the measuring wheel may be connected, by means of connections 24, to recorder 19 in a manner well understood in the well logging art.

In accordance with a preferred embodiment of our invention, the probe 16 is made up of a first elongated body member 25, which may be referred to hereinafter as the "acoustic section," and at least one other elongated hollow metallic body member, such as the body member 26. Although we prefer to employ a single hollow member 26 to house a major portion of the electronic units which are used in conjunction with the elements contained within acoustic section 25, we have also successfully constructed embodiments of our apparatus wherein the hollow member 26 was divided into two portions with one portion arranged above and the other portion arranged below the acoustic section 25. The entire probe 16 is, however, preferably constructed with uniform outer diameter so that it may be moved longitudinally within well 14.

The acoustic section 25 of probe 16 constitutes one of the novel features of the apparatus of our invention, and its structure will be particularly described hereinafter in connection with Figures 2, 3, and 4. Briefly described, however, the acoustic section 25 comprises an electro-acoustic transducer G, which is employed as a sound generator device, and at least two electro-acoustic transducers, such as $D_1$ and $D_2$, which are employed as sound detector devices. Generator G and detectors $D_1$ and $D_2$ are secured in fixedly spaced relation to each other by embodiment in the cylindrical body member 25 made up of pliable vulcanized rubber which fully encases the transducers. Suitable metallic end members which are secured in the rubber body during vulcanization of the latter provide means for fastening the acoustic section to body member 26 and a nose piece 27.

Within body member 26, we preferably house a power supply unit adapted to supply spaced surges of electric energy to transducer G and to cause the latter to emit sharp pulses of sonic energy. Also within body member 26 we house a plurality of electronic units some of which are particularly associated with the transducers $D_1$ and $D_2$, the others being adapted to control a cyclic sequence of operations of transducers G, $D_1$ and $D_2$. One of these electronic units may be referred to as a "cycle control" or "keying" unit. Another of the units may be identified as an "interval timing" unit. Still other of these units include first and second "amplifier" units, and a "low voltage power supply" adapted to furnish electrode potentials to the several electronic units as required. A further description of the electronic units will be provided in connection with Figures 7–11, inclusive.

Referring now to Figures 2, 3, and 4, a detailed description of a preferred form of the acoustic section 25 will be given. In the construction of this section of the apparatus, we prefer to employ magnetostriction transducers as the detectors $D_1$ and $D_2$ and as the generator G. A cross-sectional elevation view of one of the transducers, before assembly into the acoustic section, is shown in Figure 2. In Figure 4 there is shown a sectional plan view of one of the transducers taken along the line IV—IV of Figure 3 after inclusion of the transducer within the rubber body 25. In a preferred form, each of transducers $D_1$ and $D_2$ may comprise two-inch tall stacks of thin, ring-like laminations 28 having for example, an external diameter of three inches and an internal diameter of two and three-eighths inches. Each lamination is made from a permanently magnetizable magnetostrictive metal or an alloy, such as Permandur. This alloy comprises substantially 2% vanadium, 49% iron, and 49% cobalt. Toroidally wound over each stack of laminations is a coil of insulated wire 29 whose terminals are appropriately connected through suitable leads to the units contained within body member 26, as will be described hereinafter. Transducer G is similar to transducers $D_1$ and $D_2$, but may comprise a four-inch tall stack of ring-like laminations and, furthermore, will preferably employ fewer turns of larger diameter insulated conductor.

After assembly of the transducers as indicated above, they are positioned at desired spaced points along an elongated, cylindrical core of vulcanized rubber. Thereafter, additional amounts of unvulcanized rubber are wrapped around the central rubber core between the transducers and the wrapping is extended to cover the transducers and form the cylindrical body 25 solidly encasing the transducers therein. Care is taken to avoid the entrapment of air or other acoustic discontinuities within the rubber layers, particularly in the vicinity of the transducers. Following vulcanization of the thus formed rubber body 25, suitable spiral grooves are cut in the periphery of the body and thin-walled copper or other metallic tubes 30 and 31 are laid therein. The pairs of insulated conductors which connect each of detectors $D_1$ and $D_2$ are passed through one or the other of these tubes. It is necessary that the metallic tubes 30 and 31 should be spiralled so as to afford a tortuous, long travel-time path and thereby minimize direct transfer of sonic energy from generator G to detectors $D_1$ and $D_2$ within body member 25. After embedment of the spiralled tubes 30 and 31, the entire acoustic section may be wrapped with a final layer of rubber which is then vulcanized to form the exterior of the body 25 encasing all of the transducers and connecting leads therein.

Referring again to Figure 3 it may be seen that, during the fabrication of acoustic section 25, metallic head members 27 and 32 are vulcanized into the extremities of the elongated rubber body. The head member 27 may be conical or rounded to provide a suitable nose piece for the probe 16, while the member 32 may be threaded and provided with a suitable gasket or "O-ring" seal 33 for water-tight connection to the hollow body member 26. The metallic tubes 30 and 31 are preferably anchored by conventional compression cone connectors 34 and 35 where the metallic tubes pass from the rubber body into the interior cavity 36 within member 32. Each of tubes 30 and 31 may be provided with a suitable pressure seal termination, such as the members 37 and 38, which provides means for connecting the electrical leads carried within tubes 30 and 31 to electronic elements carried within housing 26. The pressure seal terminations 37 and 38 are provided as a safety measure to minimize the possibility of flooding the interior of housing 26 with water, mud, or other drilling fluid in the event of accidental rupture of the rubber acoustic section 25.

As shown schematically in Figure 3, electrical leads connecting between transducer G and electronic elements within body member 26 may be embedded and vulcanized into rubber contained within a central bore 39 in head member 32.

The vulcanized rubber which encases the generator G and the detectors $D_1$ and $D_2$ in accordance with our invention is chosen from commercially available rubber compositions to have acoustic properties, such as acoustic impedance and velocity of propagation of sound waves, which closely approach the acoustic properties of water. By employing a rubber having an acoustic impedance similar to that of water, the sonic energy is efficiently transferred from the generator device to the walls of the well and from thence to the detector devices. A low intensity of sound energy may, accordingly, be employed. Use of this low intensity sonic energy is advantageous since it permits the amplitude of each succeeding sonic impulse to decay more quickly to a relatively non-disturbing level.

It is well known that the velocity of propagation of sound waves in water and drilling mud is approximately 5000 feet per second or slightly less while the velocity of propagation in rock formations, such as may be encountered along the walls of a deep well in the earth, range from about 5000 feet per second upwards to 20,000 feet per second or more. Consequently the first sonic energy to arrive at each of detectors $D_1$ and $D_2$ follows the shortest time path from the generator G through surrounding water or mud in the well to the wall of the latter, thence through the earth formations forming said wall, and then to the detector devices through the mud surrounding them. This path is represented schematically by the broken line 40 in Figure 1. For this path, the angle of incidence is the critical angle $\theta$, whose value is determined primarily by the relative velocities of sound in the mud, or water, and in the adjacent earth formation. If these values are $V_1$, for the fluid in the well bore, and $V_2$, for the adjacent earth formation, then $$\sin \theta = V_1/V_2$$

If the distance from the generator G to the first detector $D_1$ is "$a$" and the second detector $D_2$ is at a distance "$b$" beyond the first, and if "$s$" is the length of the mud path at the critical angle $\theta$ from the wall of the well, then the shortest time required for a pulse of sonic energy to travel from generator G to detector $D_1$ is $$t_1 = \frac{2s}{V_1} + \frac{a-2h}{V_2}$$

Similarly the time required to travel to the detector $D_2$ is $$t_2 = \frac{2s}{V_1} + \frac{a+b-2h}{V_2}$$

The difference in travel time is $$t = t_2 - t_1$$

$$t = \frac{b}{V_2}$$

It may be seen that the value of $\Delta t$ is independent of the length of the mud path "$s$" and is, therefore, independent of the well bore diameter provided that the length represented by "$s$" is equal for detectors $D_1$ and $D_2$. If the diameter of the well bore does not change appreciably over the distance "$b$," no appreciable error is introduced into the measurement of $\Delta t$.

From the foregoing it will be apparent that, knowing the value of the distance "$b$," which is the fixed distance between detectors $D_1$ and $D_2$, and by measuring the difference in travel time $\Delta t$, the velocity of sound in earth formations adjacent $D_1$ and $D_2$ can be determined from the equation $$V_2 = \frac{b}{\Delta t}$$

From this equation it may be seen that, with a fixed distance of one foot between detectors $D_1$ and $D_2$ (as is the case in a preferred embodiment of our invention described herein), measured values of $\Delta t$ in the range between 50 and 200 microseconds correspond to sound velocities in earth in the range between 20,000 and 5000 feet per second, respectively.

The measurement of successive values of $\Delta t$ corresponding to the travel times of successive sonic, or acoustic, pulses emitted by generator G and the conversion of these values of $\Delta t$ to successive electrical quantities which are inversely proportional to the successive values of velocity in earth formations adjacent the detectors $D_1$ and $D_2$ are accomplished by certain of the electronic units contained within housing 26.

Before proceeding with a detailed description of specific electronic circuits which are illustrative of a preferred embodiment of the apparatus of our invention, a brief explanation of the operation of the apparatus will be given by reference to the block diagram of Figure 5. From this figure of the drawing it may be seen that A.C. power, provided by the source 18, is supplied through suitable conductors in cable 17 to a high voltage power supply 41 contained within housing 26. As will be explained in the subsequent description of Figure 7, the power supply 41 preferably includes a transformer for stepping up the A.C. voltage of source 18, rectifier and filter means for converting the stepped-up A.C. voltage to D.C. energy, and electrostatic capacitor for storing the D.C. energy, and a thyratron or similar switching element for controlling the discharge of the capacitor through the winding of transducer, or sound source, G contained within the acoustic section 25.

Associated with the power conversion unit 41, and more particularly with a thyratron switching element therein, is a cycle control or keying unit 42 which may include a relaxation oscillator. The natural period of operation of this oscillator may be chosen to produce any desired number of cycles of operation per second for the logging instrument. However, for purposes of illustration herein, it will be assumed that the natural period of operation of the aforementioned oscillator is one-tenth second; that is, the electrical constants within the relaxation oscillator are so chosen that ten times in each second of operation a trigger pulse is furnished to the thyratron switching element in power unit 41, and to other units to be mentioned hereinafter, so that ten sharp sonic pulses per second are generated.

Each acoustic impulse, or wave train, emitted by generator G is received in turn by detectors $D_1$ and $D_2$, and is there converted to corresponding electric signals. The signal from detector $D_1$ is passed to an electronic amplifier 43, while the signal from detector $D_2$ is passed to a similar amplifier 44. In accordance with a preferred embodiment of the apparatus of our invention, the electrical constants of elements within amplifiers 43 and 44 are arranged to produce a high-pass filtering action upon the signals passing therethrough, said filtering action being such as to attenuate sharply signal components having frequencies below about 2000 cycles per second. This feature of the apparatus of our invention substantially eliminates response of the succeeding interval timing circuit to undesired low frequency noises unavoidably created by dragging contact of the probe body 16 along the walls of the well bore. It also assists in minimizing the effects of electrical feed-over from high level elements, such as the power supply 41 and power leads in cable 17, to the detectors $D_1$ and $D_2$ and associated leads.

The character and amplitude of the impulses received by the detectors $D_1$ and $D_2$ vary greatly as the detectors are moved through a well bore, being dependent upon the type of formation, hole diameter, drilling fluid composition, and other factors. To improve the accuracy of measurement of time differences between the first arrivals at the respective detectors of each sonic impulse emitted by generator G, the amplified signals derived from amplifiers 43 and 44 are applied, respectively, to pulse generator means 45 and 46. As will be explained more fully hereinafter, pulse generator means 45 and 46 are each arranged to produce a sharp, steeply-rising negative output pulse in response to the onset, or "first kick" of each successive sonic impulse received by the detector devices $D_1$ and $D_2$, respectively. These sharp negative pulses from pulse generator means 45 and 46 are applied to an interval timing means 47.

As will be explained more fully in connection with Fig. 11, interval timer 47 preferably includes a bistable multivibrator which, in response to the negative pulses received from pulse generators 45 and 46, produces a positive substantially rectangular wave pulse whose width or duration is equal to the time difference between the onset of the respective negative pulses produced by pulse generators 45 and 46 and, in turn, is equal to the time difference between first arrivals of each successive sonic impulse received by the spaced apart detectors $D_1$ and $D_2$. The positive rectangular wave pulse is applied to an electrostatic capacitor through a constant-current resistance and switch element which thereby produces across this capacitor a voltage which is proportional to the time difference between the first arrivals of the sonic impulses received by the detector devices. The voltage across the timing capacitor is measured by a vacuum tube voltmeter associated therewith and the voltmeter output, after being applied to conductors within cable 17, is continuously recorded by recording means 19 which is preferably located at the surface of the earth adjacent the mouth of the well bore.

Simultaneously with the application of each new surge of energy to generator G, under control of cycle control means 42, a pulse, supplied by the control means 42 through reset line 48, causes the actuation of a switch associated with the interval timing capacitor. This switch is arranged to short circuit, or otherwise instantaneously remove, the charge carried by the interval timing capacitor and thereby prepare the latter to receive a new charge corresponding in magnitude to the next time interval.

In addition to being responsive to the desired successive first arrivals of sonic energy emitted by generator G and refracted through adjacent formations to detectors $D_1$ and $D_2$, these detector devices are inherently responsive to other extraneous noises inadvertently created in the well bore, and also tend to be responsive to electrical feed-over created by intermittent surges of electrical energy into power conversion means 41, the generator G, and other elements of the apparatus. A novel feature of the apparatus of our invention includes specific means for causing the interval timing unit 47 to be responsive only to the first arrivals at detectors $D_1$ and $D_2$ of the sonic pulse emitted by generator G within each timed cycle of operation. This specific means includes a delayed gate multivibrator 49, actuated under the control of cycle control means 42, which causes negative pulse generators 45 and 46 to become operative only at a fixed time after the generation of the sonic pulse within each cycle of operation. It also includes circuit elements (hereinafter referred to as "lock-out" circuit means) associated with each of pulse generators 45 and 46 which render these generators incapable of forming a second negative pulse within each timed cycle of operation.

The sequence of operations of several elements of the apparatus of our invention may be more clearly understood by reference to the time charts of Figures 6A and 6B. These time charts have been drawn to illustrate the sequence of operations of an embodiment of our invention wherein the sound source, or generator, G is spaced three feet from the nearest detector $D_1$, the detector $D_2$ is longitudinally spaced one foot beyond the detector $D_1$ in a common direction from generator G, and it is desired to measure and record values which are proportional to velocities of propagation of sound waves ranging between about 5000 and about 20,000 feet per second when the generator G is emitting sharp sonic pulses at the rate of ten pulses per second. It will be understood that the above-stated spacings and conditions of operation are exemplary of a preferred embodiment of our invention, but other spacings and conditions of operation may be employed, whereupon different time sequence charts will be required.

In the chart of Figure 6A it should be noted that the time scale is represented with an arbitrarily selected "zero time" coinciding with any selected trigger pulse generated within cycle controller 42 and the time period shown covers approximately one and one-half successive cycles of operation. The time scale of the chart of Figure 6B, however, covers one one-hundredth part of the time covered by the time scale of Figure 6A. Furthermore, the arbitrarily selected "zero time" on the chart of Figure 6B occurs one one-hundredth second later than the zero time on the chart of Figure 6A, i.e. with the beginning of the current surge to generator G.

Referring to horizontal column "a" of Figure 6A it may be seen that the occurrence of two trigger pulses from cycle controller 42 are shown at one-tenth second intervals and these pulses may be considered to mark the beginning of successive cycles of operation. Each of these pulses initiates the operation of circuits which cause: (1) the discharge of a surge of current into generator G and the resulting generation of a sonic impulse by the latter, (2) the resetting of the interval timer 47 by discharging the timing capacitor therein, and (3) actuation of gating elements within pulse generators 45 and 46. The manner in which these functions may be performed will be explained more fully in connection with a subsequent description of Figures 8, 9, 10 and 11.

The operation of the interval timer reset, and the keying of the current surge to the generator G in a preferred embodiment of our apparatus are interlocked through the medium of simultaneously operated contacts of an electromechanical relay and, because of inertia associated with this relay, there is necessarily a time delay of approximately .0075 second in the operation of the relay contacts which short circuit the timing capacitor in interval timer 47 and thereby reset the latter. This time delay is represented in horizontal column "e" of Figure 6A.

As will be explained in conjunction with Figure 8, an additional time delay, above and beyond that produced in the above mentioned relay, is introduced into the keying circuit associated with power conversion means 41 and generator G and the total time delay is represented in horizontal column "b" of Figure 6A. Immediately after the last mentioned time delay, the sound generator G is energized and a surge of current flows therethrough. Two successive, spaced apart current surges are represented in column "c" of Figure 6A and it will be understood that similarly spaced surges occur thereafter while the apparatus is in operation. From column "k" of Figure 6B, it may be seen that each surge of current is preferably of brief duration and lasts about twenty microseconds.

The sonic energy emitted as a result of the surge of current in generator G commences substantially instantaneously with said surge but continues to be emitted somewhat after the current surge has ceased. Actual duration of the sonic energy emission is difficult to measure because it varies with local conditions, such as diameter of the well bore, density of adjacent formations, hydrostatic pressure, and other factors. In any event, however, the duration of each sonic impulse is relatively short compared to the period between successive impulses. This is represented in column "d" of Figure 6A and also in column "l" of Figure 6B.

When employing the spacings between the sonic impulse generator and detectors mentioned hereinabove, it may be shown that, with the acoustic section 25 resting against the wall of the well bore, the travel time to the detector $D_1$ may be substantially as short as one hundred fifty microseconds (when the velocity of propagation of sonic impulses in the adjacent formation is 20,000 feet per second) and may be as long as six hundred microseconds (when the velocity of propagation is 5000 feet per second). This is represented in column "m" of Figure 6B. Similarly, the travel time to detector $D_2$ may be in the range from two hundred to eight hundred microseconds as represented in column "n" of the same figure. It will be apparent, then, that the difference in travel times may be a minimum of fifty microseconds, in the case of a formation having a velocity of propagation of 20,000 feet per second, or may be a maximum of two hundred microseconds, in the case of a formation having a velocity of propagation of 5000 feet per second. As will appear more fully from the description of Figure 11, the time during which the capacitor in interval timer 47 is being charged ranges between fifty and two hundred microseconds as represented in column "o" of Figure 6B. Furthermore, as shown in column "o," the interval timing capacitor must be ready to receive its charge not later than one hundred fifty microseconds after the current surge to generator G commences, and the charging time will be completed at some instant between two hundred and approximately eight hundred microseconds after the start of the aforementioned current surge.

The approximate recording time, i.e., the time during which a signal corresponding to the magnitude of the voltage built up in the interval timing capacitor is transmitted through cable 17 to recorder 19, is shown in column "f" of Figure 6A. As will be more fully understood from the subsequent description of the interval timer circuit of Figure 11, this recording time corresponds to the time during which the interval timing capacitor remains charged.

The time delay between the trigger pulse, formed in cycle controller 42, and the actuation of gate elements in pulse generators 45 and 46 is shown in column "g" of Figure 6A and also is partially shown in column "p" of Figure 6B. It should be noted that the gating pulse occurs one hundred twenty-five microseconds after the beginning of the current surge to generator G. The means for obtaining the delay and the gating pulse will be described hereinafter in connection with Figure 10. The duration of the open gate period is represented in column "h" of Figure 6A and also in column "q" of Figure 6B.

Having thus far described the mechanical structure of important elements and also the principles of operation of the apparatus for our invention, reference will now be made in turn to Figures 7–11 of the drawings in which there are shown, respectively, schematic circuit diagrams of the high voltage power supply or power conversion means 41, the cycle control means 42, the amplifiers 43 and 44 together with the gated pulse generators 45 and 46, the delayed gate multivibrator means 49, and the interval timing means 47, all of which were referred to in Figure 5.

Since voltage-regulated power supply means capable of converting the A.C. power (provided by source 18 through cable 17) to suitable D.C. potentials for operating electronic elements contained within the circuits now to be described are well known in the electrical arts and do not form a novel element of our invention, a description of such power supply means will not be given herein and such source of D.C. potentials is not represented upon the previously discussed block diagram of Figure 5. It will be understood, nevertheless, that such supply means is preferably provided within housing 26 and appropriate connections of electron tube cathodes, anodes and similar electrodes are made thereto in required manner. Similarly, suitable potentials and connections for heating the cathodes of the electronic tubes are provided.

Referring now to Figure 7, there is shown schematically a preferred form of high voltage power conversion means 41. Conductors within cable 17 are connected to the primary winding of a transformer 51. The secondary winding of this transformer is preferably center tapped and the extremities of this secondary winding are connected to the anodes of a full-wave rectifier tube 52. The center tap of the secondary winding is connected at a common ground point (represented in conventional manner at 55) which may be the metallic body of housing 26. Connected between the cathode of rectifier 52 and the common ground point is a relatively large capacitance 56. Between the cathode of the rectifier tube 52 and the anodes of a second rectifier tube 53, there is connected a high inductance choke coil 57. The transformer 51 preferably provides a relatively high A.C. voltage which is rectified by the tube 52 and the ripple in the resulting D.C. potential is smoothed out by the combined action of capacitor 56 and choke coil 57. Furthermore the capacitor 56 tends to minimize line current surges in the cable 17 when a capacitor 58 (to be described more fully hereinbelow) is being charged.

One terminal of the winding forming a part of sonic generator device G (contained with the acoustic section 25 of Figure 1) is connected to the common electrical ground point, while the other terminal thereof is connected in series through an electrostatic capacitor 58 to the cathode of rectifier tube 53. It may be seen from the drawing that, when capacitor 58 is in a discharged condition and a D.C. potential is developed across the capacitor 56 by the rectifying action of tube 52, the capacitor 58 is relatively slowly charged through the circuit including capacitor 56, choke 57, rectifier 53, capacitor 58 and the winding of sonic generator device G. By making the inductance of choke coil 57 many times larger than the inductance of the winding upon generator G and by suitably selecting the capacitance of capacitor 58, the resonant frequency of the circuit may be made sufficiently low that the flow of charging current into capacitor 58 through the winding of generator G will produce an acoustic signal of sufficiently low frequency that, after reception by detectors $D_1$ and $D_4$, it will not pass through the high-pass filter elements provided within amplifiers 43 and 44.

A switching element, adapted to discharge capacitor 58 suddenly through the winding of generator G is provided by a thyratron 54 having its cathode connected to the common ground point and its anode connected, preferably through a small inductance 59, to the junction between capacitor 58 and the cathode of rectifier 53. When a suitable triggering pulse is applied across an impedance element 60 in the grid circuit of thyratron 54 by way of a conductor 61 and a coupling capacitor 62, an electronic path is provided through thyratron 54 whereby the charge in capacitor 58 quickly surges through the relatively low inductance winding of generator G until the capacitor 58 is substantially discharged. This brief surge of current thereupon produces in generator G a brief sonic impulse having a steeply-rising wave front. Thereafter, thyratron 54 becomes non-conductive until a sufficient D.C. potential is again accumulated upon capacitor 58 and a suitable trigger pulse is again applied to the thyratron grid. By suitably selecting the capacitance of capacitor 58 with respect to the impedance of the sonic generator G, the time required to discharge capacitor 58 and the character of the sonic pulse produced by generator G may be fixed.

A pi-section filter network comprising inductance 63 and capacitors 64 and 65 may be provided in the grid circuit of thyratron 54, as shown in Figure 7, to minimize interaction between the thyratron keying circuit and the cycle control means 42.

The circuit of a preferred form of the cycle control means 42, from which the trigger pulse in conductor 61 may be derived, will now be described in connection with the schematic diagram of Figure 8.

The basic time control element of cycle control means 42 may be a relaxation oscillator which may consist of one or more cold-cathode, gas-filled diodes 66 associated with an electrostatic capacitor 67, resistors 68 and 69, and a source of D.C. potential whose positive terminal may be connected at the point marked "+B" and whose negative terminal is connected to the conventionally represented common ground point shown in the diagram of Figure 8. The series-parallel connection of capacitor 67 and resistors 68 and 69 is preferred over a more conventional series connection of the capacitor and resistor commonly employed in this type of relaxation oscillator because of the greater frequency stability thus attained in the presence of wide temperature changes encountered in well bores. The manner of operation of this relaxation oscillator will be readily understood by workers in the art and need not be described here. It is sufficient to state that electrical values of the capacitor 67 and the resistors 68 and 69 are chosen to produce in the oscillator output a saw-tooth wave form having a period of one-tenth second or any other value corresponding to the desired timing of successive cycles of operation of the logging apparatus. Manifestly, other appropriate forms of oscillators may be substituted for the simple gas-filled diode oscillator shown in Figure 8.

The saw-tooth wave output of the relaxation oscillator may be applied across an impedance element 70 connected in the grid circuit of a thyratron 71 which is arranged as an amplifier of the relaxation oscillator output signal. A suitable source of A.C. potential, applied to the terminals 72a, 72b, provides plate potential to the anode of thyratron 71 through the armature coil 73 of an electro-mechanical relay represented generally at 74. The flow of anode current through coil 73 causes energization of the relay 74 in response to each periodic signal applied to the grid of thyratron 71 by the relaxation oscillator.

In a preferred embodiment of the apparatus of our invention, the above-mentioned relay 74 is located close to, and has important connections to, an interval timing capacitor 75 which forms a major element of the interval timing means 47 that will be described in detail in connection with Figure 11. However, because the operation of relay 74 is intimately associated with the operation of cycle control means 42, its structure and operation will be described here in connection with Figure 8.

The relay 74 preferably includes five contacts 76a, 76b, 76c, 77a, and 77b. The contacts 76a, b, and c provide a single pole, double throw switching means, having contacts 76a and 76b normally closed, while the contacts 77a and b provide a single pole, single throw switching means wherein the contacts are normally opened. The contacts 77a and 77b are connected in a manner such as to short circuit, and thereby substantially fully discharge, the interval timing capacitor 75 each time the relay coil 73 is energized.

The movable contact 76a is connected in series through a small capacitor 78 to common ground while the stationary contact 76c is connected to the positive terminal of the source of D.C. potential indicated at "+B" in the circuit diagram of Figure 8. Upon energization of relay coil 73, the capacitor 78 rapidly charges to the full potential of the D.C. source. When the relay coil is deenergized the movable contact 76a becomes separated from contact 76c and makes contact with the stationary contact 76b. Contact 76b is connected to the grid circuit of a thyratron 79 having in the grid circuit thereof a relatively low resistance element 80 which rapidly discharges the capacitor 78 upon the closing of contacts 76a and 76b. Simultaneously with the closing of these latter contacts, however, a positive potential is momentarily applied to the grid of thyratron 79 and this triggers the flow of anode current in the latter. The relatively high resistance of the cathode resistor 81, which forms a part of a voltage divider network including resistor 82 in the anode circuit of thyratron 79, limits the duration of current flow to that period of time required to charge a small capacitor 83, effectively connected in parallel with resistor 81, through a resistor 84. The cathode of thyratron 79 is thereafter biased to such a high positive value that anode current cannot be sustained.

The charging pulse into the capacitor 83 is sufficient to provide a sharp, spike-like, positive pulse at the control grid of a high vacuum triode 85 which is connected as a conventional cathode follower. The output impedance of cathode follower tube 85 is matched to the primary of a pulse transformer 86 having two secondary windings. Connections are made to these two secondary windings in proper relation such that a spike-like pulse having positive polarity is derived through the conductor 61 while a similar pulse having negative polarity is derived through a conductor 87. As has been indicated hereinbefore, the conductor 61 connects to the grid electrode of the thyratron 54 contained within high voltage power supply means 41, described in connection with Figure 7. The conductor 87 supplies the negatively polarized pulse to the delay system of delayed gate multivibrator 49 which will be described hereinafter in connection with Figure 10.

Upon consideration of the foregoing description, it may be appreciated that the delay inherent in the mechanical operation of relay 74 provides the delay time shown in column "e" of Figure 6A. The somewhat longer delay time shown in column "b" of Figure 6A over that shown in column "e" is provided by the double-throw movement of contact 76a in relay 74. Before the keying of the current surge to generator G can begin, contact 76a must be drawn into contact with 76c and must then be released to make contact with 76b whereupon the surge of current to generator G begins substantially instantaneously. This small additional delay time provides an opportunity for the mirror galvanometer, which we prefer to employ in recorder 19, to swing from its instantaneous recording position to a zero position and thereby record a zero base line subsequent to the recording of each successive potential developed in the interval timing capacitor 75.

Having now described the means for generating each sonic impulse and the means for causing these impulses to be spaced apart at predetermined intervals, reference will now be made to Figure 9 wherein the schematic circuit diagrams of impulse receiving means including suitable amplifiers 43 and 44, previously referred to in Figure 5, are shown enclosed within the broken lines marked, respectively, 43 and 44. Similarly enclosed within broken lines marked 45 and 46 there are shown in Figure 9 schematic circuit diagrams of suitable gated pulse generators 45 and 46 also referred to in Figure 5.

Amplifiers 43 and 44 are preferably identical and hence, only one need be described, it being understood that the same remarks apply to the other. Similarly, gated pulse generators 45 and 46 are substantially identical to each other and only one need be described. For convenience in tracing the principal signal paths through the diagrams of Figure 9, these paths have been represented by relatively heavier lines than are used in other parts of the diagram.

Each sonic impulse received by detector $D_1$, and somewhat later by detector $D_2$, is therein converted to an electric current corresponding in wave form to the wave form of the received sonic impulse. This electric current is applied across the primary of an input transformer 90. As may be seen from the diagram of Figure 9, the primary of transformer 90 is preferably center tapped and the center tap is connected to a common ground point. The secondary of transformer 90 may provide a voltage step-up ratio and is connected in the grid circuit of a conventional high-gain voltage amplifier which may comprise a high vacuum triode tube 91. The output voltage from amplifier tube 91 is resistance-capacity coupled through a network including capacitor 92 to the control grid of a high vacuum pentode amplifier tube 93 whose voltage output is, in turn, resistance-capacity coupled through a network, including the capacitor 94, to the control grid of a second high vacuum triode amplifier tube 95.

It should be noted from the showing of Figure 9 that we prefer to operate the amplifier tube 95 with its cathode at ground potential and its control grid at a relatively high positive potential controlled by the resistor 96 connecting the control grid to the positive terminal of the D.C. voltage source. The purpose of this manner of operating amplifier tube 95 is to prevent paralysis of the amplifier by high amplitude impulses, such as, for example, as late arrival impulses which, due to circumstances encountered in the well bore, normally follow for approximately ten milliseconds after the onset, or "first kick," of each successive sonic impulse. Operation of amplifier 95 with relatively high positive potential upon its control grid causes this amplifier tube to pass saturation current from cathode to anode. The first kick of each new sonic impulse, being of negative polarity as it arrives at the grid of tube 95, momentarily reduces the plate current of the amplifier tube 95 and this reduction of plate current flowing through the plate load resistor 97 produces a voltage change which is coupled through the network including the capacitor 98 to the succeeding gated pulse generator 45. Events subsequent to the first kick, no matter how large in amplitude, can drive the grid of tube 95 to plate current cut-off value, but no paralysis of the amplifier can occur because the grid soon returns to its highly positive value and the low impedance of the grid-to-cathode circuit immediately discharges any voltage which have been built up on the grid coupling capacitor 94.

As has been mentioned hereinbefore, the amplifiers 43 and 44 are each provided with high pass filter means adapted to attenuate substantially all of those components of the received signals which have frequencies below about 2000 cycles per second. While this filtering action may, if desired, be accomplished by a specific filter network interposed at an appropriate position in each amplifier, we prefer to adjust the capacitances of coupling capacitors, such as 92 and 94, with respect to the input and load resistors of amplifier tubes 91, 93, and 95, in accordance with well known principles, so as to produce the desired frequency attenuation in the overall circuitry of amplifiers 43 and 44.

The character and initial amplitude of the signals received by detectors $D_1$ and $D_2$ vary greatly as the logging instrument is moved through the well bore. Consequently the character and amplitude of the output signals from amplifiers 43 and 44 vary similarly. Since the interval timing means 47, to be described subsequently in connection with Figure 11, produces more accurate measurements when the input signals applied thereto are of uniform character and amplitude, and since it is important that the input signals to the intervening gated pulse generators 45 and 46 should not be of sufficient amplitude to override the gate signal applied thereto, we prefer to clip the output signals from amplifiers 43 and 44 to substantially constant amplitude. This may be done by any conventional clipping means. However, we prefer to employ the diodes 99 and 100 whose cathodes are connected together and biased in common to a positive potential determined by the constant flow of current through a resistor 101 arranged in the cathode circuit of a triode 102 having different fixed D.C. potentials applied, respectively, to the control grid and anode thereof.

The signals derived from amplifier means 43 and 44 are, approximately, of clipped sinusoidal wave form and, by judicious connection of the detectors $D_1$ and $D_2$ to the input transformers of the amplifiers, the first half cycle of the output signal from each amplifier, resulting from the reception of each successive sonic impulse emitted by generator G, may be caused to be positive in polarity. Signals of this preferred form and polarity may be applied through the conductors 103 and 104 to pulse generator means 45 and 46, respectively.

As mentioned hereinbefore, pulse generator means 45 and 46 are substantially identical to each other and only one will be described in detail. Each pulse generator means comprises a thyratron 105 having the cathode thereof connected to ground through a resistor 106, which may have a resistance of twenty thousand ohms. The anode of the thyratron is connected to the positive terminal of a conventional source of D.C. potential (300 volts, for example) through two series connected resistors 107 and 108 which may have resistance values of twenty-four hundred ohms and one million ohms, respectively. The junction between resistors 107 and 108 has connected thereto one terminal of a first capacitor 109 and also one terminal of a second capacitor 110. The other terminal of capacitor 109 is connected to common ground (i.e. the negative terminal of the source of D.C. potential) while the other terminal of capacitor 110 is connected to the cathode of thyratron 105. For purposes of illustration herein, capacitors 109 and 110 may have capacitances of 0.05 and 0.001 microfarads, respectively.

Associated with the thyratron circuit described above there is also included in pulse generator 45 a gating tube 111 which is preferably a high vacuum triode. The anode of gating tube 111 is connected to the positive terminal of the source of D.C. potential while the cathode thereof is connected to the cathode of the thyratron 105, whereby the cathode resistor 106 is common to the cathodes of both the thyratron and the gating tube.

The control grids of the respective gating tubes contained within pulse generators 45 and 46 are connected in common through a conductor 112 to the delayed gate multivibrator 49 referred to in Figure 5, and shown in schematic detail in Figure 10. The control grids of the respective gating tubes, such as tube 111, are normally biased to a predetermined positive value by connection to an intermediate point upon the voltage divider comprising the two resistors 113 and 114 connected in series across the source of D.C. potential.

As will become apparent from subsequent discussion of the delayed gate multivibrator 49, this multivibrator produces in the conductor 112 a gating signal which, after a delay period of one hundred twenty-five microseconds subsequent to the beginning of the surge of current into sound generator G (see colum "p" of Figure 6B), produces a negative rectangular wave potential which lasts for one thousand microseconds (see column "q" of Figure 6B). This negative rectangular wave is superimposed upon the normal positive bias potential applied to the grid electrode of gating tube 111 and thereby reduces the normal flow of anode current through the gating tube. Since this anode current flows through the cathode resistor 106 which is common to the gating tube 111 and the thyratron 105, the cathode potential of the thyratron is reduced sufficiently to permit triggering of the flow of anode current in thyratron 105 by the onset of the first positive-going signal voltage applied to the grid of the thyratron within the gated period. The charge which has previously accumulated upon the capacitors 109 and 110 is thereupon rapidly discharged through the electronic path provided by the thyratron and this produces in the conductor 115 a sharp pulse having negative polarity which may be applied to the interval timer 47. A similar negative pulse is produced in the conductor 116 of pulse generator 46.

As soon as the capacitors 109 and 110 have substantially discharged, the flow of current through the thyratron 105 ceases and cannot be re-established until these capacitors have become recharged, the potential of the cathode has been again lowered to the gated value, and a suitable triggering pulse has been applied to the grid electrode of the thyratron.

To insure that the thyratron 105 will not be caused to fire a second time within each cycle of operation as the result of application to the grid thereof of positive impulses subsequent to that caused by the first arrival of sonic energy at the detector $D_1$, the time constant of the resistor 108 and the capacitors 109 and 110 are adjusted so as to insure against these capacitors becoming suitably recharged prior to the end of the gate period. In effect then, the elements comprising resistor 108 and the capacitor 109 (which latter, it will be noted, is many times larger than the capacitor 110) provide lock-out circuit means which prevent the generation of a second pulse by generator 45 within each specific cycle of operation.

Turning now to the schematic diagram of Figure 10 there is shown a preferred form of delayed gate multivibrator 49 employed in the apparatus of our invention. This multivibrator need not be described in detail since the circuit thereof is substantially shown in Figures 5 and 6 of an article entitled "Design of Phantastron Time Delay Circuits," by R. N. Close and M. T. Lebenbaum, published in Electronics, April 1948, pages 100–107, and the principle of operation thereof is described in said published article. As may be seen from the drawing, a negative trigger pulse, derived through conductor 87 from one of the secondary windings of transformer 86 in the cycle controller 42 of Figure 8, is applied through a blocking capacitor to the cathode of a diode-connected tube 117 and is thence applied to a conventional penta-grid tube 118. The tubes 117 and 118 and associated networks comprise a delay phantastron circuit. Since the negative trigger pulse supplied through conductor 87 is produced at the same instant in each cycle of operation as is the pulse which triggers generation of the sonic pulse in sound generator G, the function of the delay phantastron is that of providing the precise additional time delay represented by the difference between columns "g" and "b" of Figure 6A and represented more precisely by column "p" of Figure 6B. In the preferred embodiment of apparatus described herein, this additional time delay is one hundred twenty-five microseconds.

The delayed signal produced by the phantastron circuit is taken from the cathode of tube 118 and is applied to the grid of high vacuum triode 119. Triode 119 and associated elements including pulse transformer 120 in the plate circuit thereof, differentiate the delay signal and produce at the end of the delay period a spike-like pulse which is applied to a conventional "one-shot" multivibrator comprising the triodes 121 and 122 and associated network elements. The gate signal, derived across the resistor 123 which is common to the cathodes of tubes 121 and 122, is substantially a negative rectangular wave pulse which commences at the prescribed delay time subsequent to the trigger pulse applied to the delay phantastron through conductor 87. The duration of the negative rectangular wave pulse is governed by the constants of the multvibrator circuit and controls the duration of the gate period. In a preferred embodiment of the apparatus described herein this gate period is one thousand microseconds. As mentioned hereinbefore the resulting gate signal is applied through conductor 112 to the grid elements of the gating tubes contained in pulse generators 45 and 46 shown in Figure 9.

In the description thus far given, apparatus has been described wherein a sonic impulse is generated at a selected instant and the first arrival of said sonic impulse at each of two spaced detector devices produces spaced electrical pulses corresponding in time relation to the time of arrival at the respective detector devices. Figure 11 of the drawing illustrates schematically the circuit of a preferred form of electronic interval timer capable of producing an electrical quantity whose magnitude is proportional to the time difference between the aforementioned spaced electrical pulses.

The electrical pulse corresponding to the first arrival of the sonic impulse at detector $D_1$ is applied to the interval timer 47 through the conductor 115 while the electrical pulse corresponding to the first arrival at detector $D_2$ is applied to the interval timer through conductor 116. Each of these pulses is a spike-like negative pulse of substantially constant amplitude. The electrical pulse carried by conductor 115 is applied, through a suitable blocking capacitor 124, to the control grid of a high vacuum triode 125, the pulse carried by conductor 116 being similarly applied through a blocking capacitor 126 to the control grid of a second high vacuum triode 127.

Triodes 125 and 127 are interconnected with associated capacitor and resistor networks to form a conventional bi-stable multivibrator. At the beginning of each cycle of operation, the triode 125 is biased to provide anode current flow therethrough while triode 127 is biased to prevent substantial anode current flow. Upon arrival of a negative trigger pulse from pulse generator 45 via conductor 115, triode 125 is momentarily biased to a condition wherein it becomes non-conducting and triode 127 becomes conducting. This condition continues until the arrival of a negative trigger pulse from pulse generator 46 via conductor 116. Thereupon triode 127 becomes non-conducting and triode 125 returns to its original conducting condition.

As a result of the above-described "flip-flop" action of the bi-stable multivibrator, there is developed in the plate circuit of triode 125 a rectangular wave signal having a very steeply rising wave front whose crest value continues for a time identical to the time difference ($\Delta t$) between the two trigger pulses carried by conductors 115 and 116. This signal is preferably applied to the control grid of a conventional cathode follower comprising a triode 128 and associated network elements. The purpose of this cathode follower is to provide suitable impedance transformation from the relatively high impedance plate circuit of multivibrator tube 125 into the relatively low impedance grid circuit of a high vacuum pentode 129 which is arranged to serve as a switch and as a constant-current resistance element effectively connected in series with the interval timing capacitor 75 previously mentioned in connection with the description of Figure 8 of the drawing.

As may be seen from Figure 11, the interval timing capacitor 75 is connected to the anode and to the screen grid of pentode 129. Furthermore, the normally-open contacts 77a and 77b of the relay 74 (previously referred to in Figure 8) are connected in a manner such as to short circuit, and thereby discharge, capacitor 75 when these contacts are closed.

The cathode of pentode 129 is biased at a fixed potential above ground by connection to an intermediate point upon the voltage divider formed by resistors 130 and 131 connected in series across the source of fixed D.C. potential. The cathode bias potential thus provided is adjusted to such a value that anode current flow through pentode 129 is cut off at all times except during the period when the positively polarized rectangular wave crest, derived from the bistable multivibrator through cathode follower 128, is applied to the control grid of pentode 129 across a grid return resistor 132. During this period, current flow through pentode 129 is substantially constant and is employed to charge the interval timing capacitor 75.

It should be understood from the discussion of the operation of relay 74, given hereinbefore in connection with the operation of the cycle control means 42 of Figure 8, that the relay contacts 77a and 77b are caused to be closed shortly before the surge of current through the sound source generator G is initiated. The interval timing capacitor 75 is, therefore, substantially completely discharged, or "reset," prior to the possible arrival of a signal corresponding to a $\Delta t$ value. Consequently, the capacitor 75 begins each new cycle of operation of the logging instrument with substantially no charge therein and, since this capacitor is subsequently charged at constant rate by the flow of current through pentode 129 during the precise crest period of the rectangular wave signal supplied by the bistable multivibrator in response to the first arrivals of each spaced-apart sonic impulse at detector devices $D_1$ and $D_2$, the final voltage appearing across the timing capacitor 75 is directly proportional to the time difference ($\Delta t$) between said first arrivals. Since the detectors $D_1$ and $D_2$ are also spaced a fixed distance apart in a common direction from the sound source G, it will be appreciated that the magnitude of the final voltage developed across capacitor 75 within each cycle of operation is inversely proportional to the velocity of propagation of sonic impulses through the earth formations adjacent the detector devices.

In a preferred embodiment of the apparatus of our invention the voltage developed across the capacitor 75 in each successive cycle of operation is continuously measured and recorded by a recording vacuum tube voltmeter. This voltmeter comprises a high vacuum triode 133, a similar high vacuum triode 134, a cold cathode gas-filled diode or voltage regulator tube 135, and a recording galvanometer 136, the latter element forming a part of the recorder 19.

As may be seen from the schematic diagram of Figure 11, the control grid electrode of triode 133 is connected to a junction between one terminal of the interval timing capacitor 75 and the anode of pentode 129. The cathode of triode 133 is connected through a resistor 137 to a conductor 138 which, in turn, is connected to a junction between the other terminal of capacitor 75 and the screen grid electrode of pentode 129. The anode of triode 133 is maintained at a fixed positive potential by connection directly to the positive terminal of the D.C. supply.

Triode 134 is substantially in parallel with the triode 133. However, the grid electrode of triode 134 is connected to the cathode of triode 133. A resistor 139, connecting between the cathode of triode 134 and the conductor 138, may have a substantially smaller value of resistance than the resistor 137 in the cathode circuit of triode 133.

The potential on the conductor 138, and on the several tube electrodes connected thereto, is maintained at a substantially fixed level above common ground potential by connection to the anode of the voltage regulator tube 135 whose cathode is connected to common ground through the recording galvanometer 136 and a pair of interconnecting conductors contained within cable 17. The potential on the conductor 138 is stabilized further by the relatively large capacitor 140 which is effectively shunted across the series circuit comprising tube 135, galvanometer 136 and the conductors in cable 17.

It will be apparent to workers in the art that the changes in potential appearing across interval timing capacitor 75, as a result of repeated charging and discharging thereof, produces similar changes in the flow of anode current through triode 133. These changes in anode current, which must flow through the cathode resistor 137, develop similarly changing voltages across resistor 137. The latter voltage changes are applied to the grid electrode of triode 134 and alter the flow of current through cathode resistor 139. Obviously the changes in current flowing through cathode resistors 137 and 139 occur simultaneously though not necessarily in the same amount. In any case, however, substantially all of the current flowing in both of these cathode circuits must also flow through the voltage regulator tube 135 and the galvanometer 136 which are effectively in series therewith across the common source of potential.

As a result of the above-described operation, the recording galvanometer 136 produces a rectangular wave trace wherein the amplitude of the trace is directly proportional to the magnitude of the potential developed across the interval timing capacitor 75. Stated in other words, the amplitude of the trace produced by recording galvanometer 136 is inversely proportional to the velocity of propagation of sonic waves in the earth formations along the wall of the well bore adjacent the detector devices $D_1$ and $D_2$.

In a preferred embodiment of the apparatus of our invention, the recording galvanometer 136 is preferably a conventional mirror galvanometer which reflects a beam of light upon a sheet of photo-sensitive film or paper that is moved in correlation with the movement of the logging probe 16 along the well bore in a manner well understood in the well logging art. Because the light beam reflected by the galvanometer moves very rapidly from the base line to the crest (and vice versa) in tracing the rectangular wave output of the vacuum tube voltmeter circuit, the resulting photographically recorded log takes on the appearance of two widely separated lines of elongated dots: one line being the trace produced by the galvanometer along the base line of the rectangular wave output and corresponding to zero values of $\Delta t$ (i.e. infinite velocity of propagation), the other line being the trace produced by the galvanometer along the crest of the rectangular wave output and corresponding to the logged values of $\Delta t$, which values are inversely proportional to the velocity of propagation of sonic waves in the formations adjacent the detector devices.

Because the time integrating unit, shown in Figure 11 and comprising the constant current resistance element (provided by pentode 129) and the timing capacitor 75, constitutes one of the most critical assemblies within the apparatus of our invention, we prefer to house this unit, together with the elements including the relay 74, the triode 133, and the resistor 137 (all of which are connected directly to the capacitor 75) within an hermetically sealed housing, represented by the broken line 141. Preferably the housing 141 is evacuated and sealed to prevent ingress of moist air which tends to alter the electrical resistance and leakage paths between elements connected directly to capacitor 75. Alternatively, the housing 141 may be filled with carefully dried air or other gas and then be suitably sealed to prevent ingress of moisture.

While we have illustrated the apparatus of our invention by reference to specific structure and by means of specific electronic circuit diagrams, it will be understood by workers in the art that many changes may be made therein without departing from the spirit of our invention. Thus, although only two sonic detector devices, followed by two gated pulse generators and one interval timing system, have been shown for purposes of simplification, it will be appreciated that additional detector devices spaced in a common direction from the sound generator device may also be employed provided each detector device is followed by its own amplifier and gated pulse generator and an appropriately actuated interval timer. Furthermore, equivalent forms of electro-acoustic transducers, sonic pulse generating means, cycle control means, gating systems, and interval timing may be substituted for the specific forms shown without departing from the spirit and scope of the appended claims.

What we claim as new and useful and desire to secure by Letters Patent is:

1. Apparatus for logging earth formations traversed by a well bore comprising, in combination, a sonic generator device; a plurality of sonic detector devices; an elongated body member carrying said generator and detector devices with the detector devices being fixedly spaced in substantialy a straight line at different longitudinal distances in a common direction from the generator device within the body member; means for moving said body member longitudinally along the well bore; means, including a switching element and an electrostatic capacitor, for supplying a surge of electric energy to said generator device whereby a sonic impulse is emitted from the latter; means, including an oscillator operatively associated with said switching element, for controlling the time of application of said surge of electrical energy to said generator device and for causing the time between successive applications of said surge to be long relative to the average duration of each surge; means responsive to the first arrival of each resulting successive sonic impulse at the respective detector devices for producing successive direct current electrical quantities each having a magnitude which is proportional to the time difference between first arrivals at the respective detector devices of each successive sonic impulse emitted by the generator device; and means for recording said electrical quantities as a function of the depth of said body member in the well bore.

2. Apparatus for logging earth formations traversed by a well bore comprising, in combination, a sonic generator device; first and second sonic detector devices; an elongated rubber body member having an acoustic impedance substantially equal to that of fluids within the well bore, said body encasing said generator and detector devices therein, the detector devices being fixedly spaced in substantially a straight line at different longitudinal distances in a common direction from the generator device within the body member; means for moving said body member longitudinally along the well bore; means, including a switching element and an electrostatic capacitor, for supplying successive controlled surges of electrical energy to said generator device whereby successive sonic pulses are emitted from the latter; means, including an oscillator operatively associated with said switching element, for controlling the time between applications of successive surges of electrical energy to said generator device and for causing said time to be long relative to the average duration of each surge of electrical energy; means responsive to the first arrival of each successive sonic pulse at said first and second detector devices for producing successive direct current electrical quantities each having a magnitude which is proportional to the time difference between first arrivals at said first and second detector devices, respectively, of each successive sonic pulse emitted by the generator device; and means for recording said electrical quantities as a function of the depth of said body member in the well bore.

3. Apparatus for logging the velocity of propagation of sonic impulses in earth formations traversed by a well bore comprising, in combination, a sonic generator device; first and second sonic detector devices for receiving sonic impulses emitted by said generator device and for converting the received impulses to electrical signals; a first elongated body member comprising resilient rubber having an acoustic impedance substantially equal to that of fluids within the well bore, said body member encasing said generator and detector devices therein with the respective detector devices fixedly spaced at different longitudinal distances in a common direction from the generator device; means for moving said body member longitudinally along the well bore; at least one other elongated body member secured collinearly to said first body member and housing therein: means, including an electrostatic capacitor, for supplying a surge of electrical energy periodically to said generator device; cycle control means, comprising a relaxation oscillator, for regulating the periodicity of a plurality of cycles of operation, the period of each cycle being long relative to the average duration of each surge of electrical energy; switching means, associated with said electrostatic capacitor and actuated under control of said cycle control means at a selected instant within each of said cycles of operation, for causing the application of said surge of electrical energy to said generator device whereby one sonic impulse is emitted within each cycle of operation; and means, responsive only to the first arrival of said sonic impulse at said first detector device and at said second detector device within each cycle of operation, for producing an electrical quantity having a magnitude which is proportional to the time difference between said first arrivals; and means, external to said first and other body members, for recording said electrical quantity as a function of the depth of said detector devices in the well bore.

4. Apparatus for logging the local velocity of propagation of sonic impulses in earth formations traversed by a well bore comprising, in combination, a sonic generator device; first and second detector devices for receiving sonic impulses emitted by said generator device and for converting the received impulses to first and second electrical signals, respectively; a first elongated body member comprising resilient rubber solidly encasing said generator and detector devices therein with the detector devices fixedly spaced at different longitudinal distances in a common direction from the generator device; means for moving said body member longitudinally along the well bore; an elongated hollow body member secured collinearly to said first body member and housing therein: means, including a first electrostatic capacitor, for supplying a surge of electrical energy periodically to said generator device; cycle control means, comprising a relaxation oscillator, for regulating the periodicity of a plurality of cycles of operation, the period of each cycle being long relative to the average duration of each surge of electrical energy; first switching means, associated with said first capacitor and actuated under control of said cycle control means at a selected instant within each of said cycles of operation, for causing application of said surge of electrical energy to said generator device whereby one sonic impulse is emitted within each of said cycles; first and second amplifier means connected, respectively, to said first and second detector devices for separately amplifying said first and second electrical signals, each of said amplifier means including therein high-pass filter means for attenuating from said signals components having frequencies below about 2000 cycles per second; first and second pulse generator means, each comprising a thyratron connected, respectively, to said first and second amplifier means, for forming first and second negative pulse signals from the respective signals derived from said amplifier means; gating means, comprising a multivibrator operatively connected to both of said pulse generator means and actuated under control of said cycle control means, for confining generation of both said negative pulse signals within a selected portion of each cycle of operation; first and second lock-out circuit means, associated with said first and second pulse generator means, respectively, for rendering each of the latter unresponsive to all but the initial onset of the respective electric signals derived from said amplifier means whereby said first and second negative pulse signals correspond in time relation to the first arrival times at said first and second detector devices, respectively, of the sonic impulse emitted by the sonic generator device within each cycle of operation; interval timing means, comprising a second electrostatic capacitor in series with a resistive element and suitably connected to a bistable multivibrator operatively connected for actuation by said first and second negative pulse signals, for forming in said second capacitor an electrical quantity having a magnitude proportional to the time difference between said negative pulse signals; and second switching means, connected in shunt with said second capacitor and actuated under control of said cycle control means simultaneously with said first switching means for dissipating said electrical quantity from said second capacitor; and means external to said first and second body members for recording the magnitude of said electrical quantity as a function of depth of said detector devices in the well bore.

5. Apparatus for logging earth formations traversed by a well bore comprising, in combination, a sonic generator device; a plurality of sonic detector devices; an elongated body member carrying said generator and detector devices with the detector devices being fixedly spaced in substantially a straight line at different longitudinal distances in a common direction from the generator device within the body member; means for moving said body member longitudinally along the well bore; means for supplying a surge of electric energy to said generator device whereby a sonic impulse is emitted from the latter; means for controlling the time of application of said surge of electrical energy to said generator device and for causing the time between successive applications of said surge to be long relative to the average duration of each surge; an electrostatic capacitor located within said elongated body member, means electrically connecting said electrostatic capacitor to said detector devices to charge said electrostatic capacitor an amount proportional to the time difference between first arrivals at the respective detector devices of a sonic impulse; means for recording said charges as a function of the depth of said body member in the well bore; and means for automatically and momentarily short circuiting said electrostatic capacitor to cause the complete discharge of said electrostatic capacitor prior to the arrival at each of said detector devices of the next sonic impulse.

6. Apparatus for logging earth formations traversed by a well bore comprising, in combination, a sonic generator device; two sonic detector devices; an elongated body member carrying said generator and detector devices with the detector devices being fixedly spaced at different longitudinal distances along a substantially straight line in a common direction from the generator device within the body member; means for moving said body member longitudinally along the well bore; a voltage power supply electrically connected to said sonic generator device; a cycle controller, including an oscillator, electrically connected to said voltage power supply for controlling the time of application of a surge of electrical energy to said generator device and for causing the time between surges to be long relative to the duration of each surge; an interval timing circuit including an electrostatic capacitor therein; electrical means connecting said interval timing circuit to each of said detector devices, said electrostatic capacitor thereby becoming charged an amount proportional to the time difference in arrival at each detector device of the impulses generated from said generator device; means for recording said electrical charge as a function of the depth of said body member; electrical means connecting said interval timing circuit with said cycle controller; and means within said interval timing circuit adapted to be momentarily actuated by said oscillator to short circuit said electrostatic capacitor causing the discharge of said electrostatic capacitor prior to the arrival at each of said detector devices of the next sonic impulse.

7. Apparatus for logging the local velocity of propagation of sonic impulses in earth formations traversed by a well bore comprising, in combination, a sonic generator device; first and second detector devices for receiving sonic impulses emitted by said generator device and for converting the received impulses to first and second electrical signals, respectively; a first elongated body member encasing said generator and detector devices therein with the detector devices fixedly spaced at different longitudinal distances in a common direction from the generator device; means for moving said body member longitudinally along the well bore; an elongated hollow body member secured collinearly to said first body member and housing therein means, including a first electrostatic capacitor, for supplying a surge of electrical energy periodically to said generator device; cycle control means, comprising a relaxation oscillator, for regulating the periodicity of a plurality of cycles of operation, the period of each cycle being long relative to the average duration of each surge of electrical energy; first switching means, associated with said first capacitor and actuated under control of said cycle control means at a selected instant within each of said cycles of operation, for causing application of said surge of electrical energy to said generator device whereby one sonic impulse is emitted within each of said cycles; first and second pulse generator means, each comprising a thyratron connected, respectively to said first and second detector devices for forming first and second pulse signals from the respective signals derived from said detector device; first and second lock-out circuit means, associated with said first and second pulse generator means, respectively, for rendering each of the latter unresponsive to all but the initial onset of the respective electric signals derived from said detector device thereby said first and second pulse signals correspond in time relation to the first arrival times at said first and second detector devices, respectively, of the sonic impulse emitted by the sonic generator device within each cycle of operation; interval timing means, comprising a second electrostatic capacitor in series with a resistive element and suitably connected to a bistable multivibrator operatively connected for actuation by said first and second pulse signals, for forming in said second capacitor an electrical quantity having a magnitude proportional to the time difference between said pulse signals; and second switching means, connected in shunt with said second capacitor and actuated under control of said cycle control means simultaneously with said first switching means for dissipating said electrical quantity from said second capacitor; and means external to said first and second body members for recording the magnitude of said electrical quantity as a function of depth of said detector devices in the well bore.

8. Apparatus for logging the velocity of a sonic impulse in earth formations including a sonic generator and at least two detecting devices aligned with said generator and in a common direction from said generator, circuitry connected to said detectors, a storage device in said circuitry, the signal from a first of said detectors initiating the storage of a direct current electrical quantity in said storage device, and the signal from a second of said detectors terminating the storage of said direct current electrical quantity in said storage device, and measuring means operatively connected to said storage device, whereby measurement of the electrical quantity stored in said storage device will determine the velocity of the signal in the medium being measured.

9. An apparatus in accordance with claim 8 wherein the storage device is an electrostatic capacitor and the measuring means includes a switching member operatively connected to said electrostatic capacitor for discharging said electrostatic capacitor.

References Cited in the file of this patent

UNITED STATES PATENTS

| Number | Name | Date |
|---|---|---|
| 2,076,330 | Wood et al. | Apr. 6, 1937 |
| 2,200,476 | Mounce | May 14, 1940 |
| 2,207,281 | Athy et al. | July 9, 1940 |
| 2,233,992 | Wyckoff | Mar. 4, 1941 |
| 2,238,991 | Cloud | Apr. 22, 1941 |
| 2,269,603 | Rockwood | Jan. 13, 1942 |
| 2,271,951 | Pearson et al. | Feb. 3, 1942 |
| 2,301,195 | Bradford | Nov. 10, 1942 |
| 2,301,458 | Salvatori | Nov. 10, 1942 |
| 2,324,378 | Flude | July 13, 1943 |
| 2,364,209 | Green | Dec. 5, 1944 |
| 2,395,902 | Nisewanger et al. | Mar. 5, 1946 |
| 2,434,285 | Peek | Jan. 13, 1948 |
| 2,436,563 | Frosch | Feb. 24, 1948 |
| 2,438,925 | Krantz | Apr. 6, 1948 |
| 2,461,543 | Gunn | Feb. 15, 1949 |
| 2,530,971 | Kean | Nov. 21, 1950 |
| 2,586,745 | Tullos | Feb. 19, 1952 |
| 2,596,024 | Goble et al. | May 6, 1952 |
| 2,648,056 | Jakosky | Aug. 4, 1953 |
| 2,675,086 | Clewell | Apr. 13, 1954 |
| 2,691,422 | Summers et al. | Oct. 12, 1954 |
| 2,699,529 | Wenk | Jan. 11, 1955 |
| 2,704,364 | Summers | Mar. 15, 1955 |
| 2,708,485 | Vogel | May 17, 1955 |
| 2,709,918 | Yetter | June 7, 1955 |
| 2,712,124 | Ording | June 28, 1955 |